UNITED STATES PATENT OFFICE.

WILLIAM H. PERRINE, OF NEW YORK, N. Y.

FIBROUS PRODUCT OF BAMBOO.

SPECIFICATION forming part of Letters Patent No. 283,510, dated August 21, 1883.

Application filed July 21, 1883. (No specimens.)

*To all whom it may concern:*

Be it known that I, WM. H. PERRINE, of the city, county, and State of New York, have invented a certain new and useful substance of a tenacious and fibrous character produced from bamboo, cane, or reed, which I term Fibrous Product of Bamboo, of which the following is a specification.

The special object of my invention, so far as its practical utility is concerned, is to prepare a fibrous product of bamboo that is peculiarly adapted for use as packing for car-axle boxes and for like purposes, although it may also be very useful for several other purposes.

It is well known that large quantities of what is commercially known as "waste" are used for packing car-axle boxes, and that much trouble arises from the imperfections of this substance, although it was the best known for the purpose previous to my invention, and for that reason is now in general use.

I have discovered that the fibers of the plant variously termed "bamboo," "cane," or "reed," when properly prepared, possess all the properties requisite for the very best packing for car-axle boxes; and after many experiments I have demonstrated that I can manufacture waste from bamboo, cane, or reed of a very superior quality and possessing advantages over any previously known—such as requiring much less oil, wearing longer, holding moisture better, lying lighter in the box and thus keeping up to the journals, and not becoming hard or caked, as the waste commonly used is liable to do.

I have successfully prepared the fibers of bamboo, cane, or reed by the following process, viz: passing the bamboo, cane, or reed between heavy rollers for the purpose of crushing or splitting it longitudinally, which separates the fibers to such an extent as admits of the silicious or resinous matter being rapidly and thoroughly removed by subsequent treatment; then removing the knots or joints and placing the lengths between the knots or joints in a suitable boiler, and boiling the same from eight to twelve hours in an aqueous solution of caustic alkali, termed "caustic soda," of a strength of from 6° to 10° Baumé, or until the resinous silicious matter is dissolved. This operation may be performed under pressure or in open kettles; but I prefer to boil under a pressure of forty to one hundred pounds to the square inch. After the boiling has been completed the plant is thoroughly washed, and then passed between rollers for the purpose of expelling the water and so much of the silicious or resinous matter as may be held in solution or contained in the fibers, and to disintegrate them, so that they may be more readily separated. After being dried it is then passed through a set of corrugated rolls for the purpose of softening it and rendering it pliable, and then through a willow or beater for the purpose of beating it and opening it up, thus insuring length of fiber and removing any foreign matter it may contain, and preparing it for the subsequent process of carding, which is performed by passing it through the necessary card or cards to bring it to a proper condition for the purpose required—that is, to a light fluffy mass, somewhat like tow, for example, which may be used alone, or mixed with the ordinary waste of commerce now in use in such proportions as desired. It will greatly improve ordinary waste to mix with it a portion of this improved waste or fibrous product of bamboo.

Although I have herein described a process which I have found suitable for the preparation of waste from bamboo, cane, or reed, I do not wish to be understood as limiting my claim of invention to said process, as other processes may be devised suitable for the purpose.

What I claim as new, and desire to secure by Letters Patent, is—

The use of the fibrous product of bamboo, cane, or reed, either separately or in combination with other materials, as packing for car-axle boxes, substantially as set forth.

In testimony whereof I have hereunto subscribed my name this 20th day of July, A. D. 1883.

WILLIAM H. PERRINE.

Witnesses:
JOHN S. OWDEN,
EDWARD OWEN.